US012806964B2

(12) United States Patent
Lee et al.

(10) Patent No.: US 12,806,964 B2
(45) Date of Patent: Nov. 24, 2026

(54) VEHICULAR HEAT MANAGEMENT SYSTEM

(71) Applicant: Hanon Systems, Daejeon (KR)

(72) Inventors: Jae Min Lee, Daejeon (KR); In Keun Kang, Daejeon (KR); Young Man Kim, Daejeon (KR); In Hyeok Kim, Daejeon (KR); Jae Kyun Kim, Daejeon (KR); Kyeong Cheol Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 48 days.

(21) Appl. No.: 18/845,912

(22) PCT Filed: Jun. 28, 2023

(86) PCT No.: PCT/KR2023/009016
§ 371 (c)(1),
(2) Date: Sep. 11, 2024

(87) PCT Pub. No.: WO2024/025170
PCT Pub. Date: Feb. 1, 2024

(65) Prior Publication Data

US 2025/0196581 A1 Jun. 19, 2025

(30) Foreign Application Priority Data

Jul. 26, 2022 (KR) ........................ 10-2022-0092228

(51) Int. Cl.
*B60H 1/00* (2006.01)
*B60H 1/14* (2006.01)

(52) U.S. Cl.
CPC ..... *B60H 1/00921* (2013.01); *B60H 1/00271* (2013.01); *B60H 1/00785* (2013.01);
(Continued)

(58) Field of Classification Search
CPC ............ B60H 1/00271; B60H 1/00785; B60H 1/00764; B60H 1/00921; B60H 1/143; B60H 2001/00307
See application file for complete search history.

(56) References Cited

U.S. PATENT DOCUMENTS

2017/0210203 A1* 7/2017 Quix .................. B60H 1/00885
2019/0030992 A1* 1/2019 Tada ........................ B60H 1/22

FOREIGN PATENT DOCUMENTS

JP 2020050155 A 4/2020
KR 20150049007 A 5/2015
(Continued)

OTHER PUBLICATIONS

KR 10-2022-0050560 (English translation) (Year: 2022).*
International Search Report issued in PCT/KR2023/009016 on Sep. 26, 2023.

*Primary Examiner* — Jonathan Bradford
(74) *Attorney, Agent, or Firm* — NORTON ROSE FULBRIGHT US LLP

(57) ABSTRACT

A vehicular heat management system includes a heat pump type refrigerant circulation line configured to operate in an air conditioner mode or a heat pump mode to cool and heat a passenger room, a cooling water circulation line configured to allow a cooling water to circulate toward an electric component module, the refrigerant circulation line including a water-cooled heat exchanger configured to allow a refrigerant to exchange heat with the cooling water in the cooling water circulation line to recover waste heat of the electric component module absorbed by the cooling water to the refrigerant in the refrigerant circulation line and an air-cooled outdoor heat exchanger installed on the downstream side of the water-cooled heat exchanger, and a refrigerant flow control part configured to control a refrigerant flow path in the refrigerant circulation line to the water-cooled
(Continued)

heat exchanger and the air-cooled outdoor heat exchanger in the heat pump mode.

10 Claims, 4 Drawing Sheets

(52) U.S. Cl.
CPC ... *B60H 1/143* (2013.01); *B60H 2001/00307* (2013.01); *B60H 2001/00928* (2013.01)

(56) References Cited

FOREIGN PATENT DOCUMENTS

| | | | |
|---|---|---|---|
| KR | 102183499 | B1 | 11/2020 |
| KR | 20210079741 | A | 6/2021 |
| KR | 20220050560 | A | 4/2022 |

* cited by examiner

FIG. 1 PRIOR ART

VEHICULAR HEAT MANAGEMENT SYSTEM

CROSS REFERENCE TO RELATED APPLICATIONS

This patent application is a national phase under 35 U.S.C. § 371 of International Patent Application No. PCT/KR2023/009016 filed Jun. 28, 2023, which claims the benefit of priority from Korean Patent Application No. 10-2022-0092228 filed Jul. 26, 2022, each of which is hereby incorporated herein by reference in its entirety for all purposes.

TECHNICAL FIELD

The present invention relates to a vehicular heat management system and, more particularly, to a vehicular heat management system configured to additionally recover ambient air heat to the refrigerant of a refrigerant circulation line under conditions where the waste heat of an electric component module is insufficient in a heat pump mode, so that the waste heat recovery efficiency of the refrigerant in the refrigerant circulation line can be increased to improve the heat pump mode efficiency even though the waste heat of the electric component module is insufficient.

BACKGROUND ART

Examples of an eco-friendly vehicle include an electric vehicle, a hybrid vehicle, and a fuel cell vehicle (hereinafter collectively referred to as "vehicle").

Such a vehicle is equipped with an air conditioning system 10 for cooling and heating a passenger room as shown in FIG. 1.

The air conditioning system 10 is of a heat pump type and is provided with a refrigerant circulation line 12.

The refrigerant circulation line 12 includes a compressor 12*a*, a high pressure side heat exchanger 12*b*, a heat pump mode expansion valve 12*c*, a water-cooled heat exchanger 12*d*, a three-way flow control valve 12*e*, an air-cooled outdoor heat exchanger 12*f*, a plurality of air conditioner mode expansion valves 12*g* installed in parallel with each other, and a plurality of low pressure side heat exchangers 12*h* installed downstream of the respective air conditioner mode expansion valves 12*g*.

This refrigerant circulation line 12 opens the heat pump mode expansion valve 12*c* in an air conditioner mode, so that the refrigerant in the compressor 12*a* is not depressurized and expanded by the heat pump mode expansion valve 12*c* and can be circulated in the order of the high pressure side heat exchanger 12*b*, the water-cooled heat exchanger 12*d*, the three-way flow control valve 12*e*, the air-cooled outdoor heat exchanger 12*f*, the air conditioner mode expansion valve 12*g*, the low pressure side heat exchanger 12*h*, and the compressor 12*a*.

Through this refrigerant circulation, low temperature cold air is generated in the low pressure side heat exchanger 12*h*, and is fed to the passenger room and the battery B to cool the passenger room and the battery B.

In addition, in the heat pump mode, the heat pump mode expansion valve 12*c* is turned on to allow depressurization and expansion of the refrigerant, so that the refrigerant in the compressor 12*a* is circulated in the order of the high pressure side heat exchanger 12*b*, the heat pump mode expansion valve 12*c*, the water-cooled heat exchanger 12*d*, the three-way flow control valve 12*e*, and the compressor 12*a*.

Through this refrigerant circulation, the heat generated in the high pressure side heat exchanger 12*b* is supplied to the passenger room to heat the passenger room.

Meanwhile, the water-cooled heat exchanger 12*d* functions as an evaporator in the heat pump mode and also plays a role in allowing the refrigerant flowing therein to exchange heat with the cooling water on the cooling water circulation line 20 side for cooling an electric component module P.

In particular, the cooling water in the cooling water circulation line 20 that has absorbed the waste heat of the electric component module P is allowed to exchange heat with the refrigerant of the water-cooled heat exchanger 12*d*.

Accordingly, the waste heat of the electric component module P can be recovered to the refrigerant in the refrigerant circulation line 12, and as a result, the heat pump mode efficiency of the air conditioning system 10 can be increased.

However, according to this conventional heat management system, in the heat pump mode, the temperature of the electric component module P is lowered under conditions where the waste heat of the electric component module P is insufficient, for example, when the vehicle is idling. Thus, the waste heat of the electric component module P is not sufficient.

In these conditions, the cooling water temperature in the cooling water circulation line 20 is also low. Therefore, the waste heat recovery efficiency of the refrigerant in the refrigerant circulation line 12 for the electric component module P on the cooling water circulation line 20 side becomes low.

In particular, the waste heat of the electric component module P on the cooling water circulation line 20 side is recovered in the water-cooled heat exchanger 12*d* by the refrigerant in the refrigerant circulation line 12. If the waste heat of the electric component module P is insufficient, the recovery efficiency of the waste heat of the electric component module P in the water-cooled heat exchanger 12*d* is very low.

Therefore, under conditions where the waste heat of the electric component module P is insufficient, the heat pump mode efficiency is lowered, and as a result, the heating performance in the passenger room is significantly reduced.

In consideration of this, there has been described a technique of controlling the three-way flow control valve 12*e* in the heat pump mode to circulate the refrigerant passed through the water-cooled heat exchanger 12*d* toward the air-cooled outdoor heat exchanger 12*f*.

According to this technique, in the heat pump mode, the refrigerant passed through the water-cooled heat exchanger 12*d* is circulated toward the air-cooled outdoor heat exchanger 12*f*, thereby allowing the refrigerant on the internal flow path side of the air-cooled outdoor heat exchanger 12*f* to exchange heat with the ambient air.

As a result, the ambient air heat is additionally recovered, and the waste heat recovery efficiency for the refrigerant in the refrigerant circulation line 12 is increased to improve the heat pump mode efficiency.

According to this conventional technique, when the refrigerant that has recovered ambient air heat in the air-cooled outdoor heat exchanger 12*f* is returned to the compressor 12*a*, the refrigerant has to pass through resistors such as the air conditioner mode expansion valve 12*g*, the low pressure side heat exchanger 12*h* and the like on the air conditioner mode cooling line 14 of the refrigerant circulation line 12.

As a result, the refrigerant has to pass through the long refrigerant pipe on the air conditioner mode cooling line 14 extending up to the compressor 12*a*, consequently increasing flow path resistance and resultant pressure loss.

In particular, the refrigerant on the downstream side of the heat pump mode expansion valve 12*c* kept at a low pressure in the heat pump mode. Therefore, flow resistance and pressure loss occur greatly when the refrigerant kept at this low pressure passes through resistors such as the air conditioner mode expansion valve 12*g*, the low pressure side heat exchanger 12*h* and the like of the air conditioner mode cooling line 14, and the long refrigerant pipe on the air conditioner mode cooling line 14 side.

Thus, the work of the compressor 12*a* is reduced, and the heating performance of the air conditioning system 10 is lowered.

In consideration of this, there has been proposed a method of compensating for the refrigerant flow resistance and pressure loss in the section from the air-cooled outdoor heat exchanger 12*f* to the compressor 12*a* by increasing the pipe diameter on the side of the air conditioner mode cooling line 14 in the section from the air-cooled outdoor heat exchanger 12*f* to the compressor 12*a*, for example, by increasing the pipe diameter to 12 mm.

However, in this case, due to the increased pipe diameter, the costs are increased, and there are many design limitations such as interference between surrounding parts.

DETAILED DESCRIPTION OF THE INVENTION

Technical Task

In view of the problems inherent in the related art, it is an object of the present invention to provide a vehicular heat management system capable of, under conditions where the waste heat of an electric component module is insufficient in a heat pump mode, additionally recovering ambient air heat to a refrigerant of a refrigerant circulation line using an air-cooled outdoor heat exchanger.

Another object of the present invention is to provide a vehicular heat management system capable of increasing the waste heat recovery efficiency of a refrigerant of a refrigerant circulation line to improve the heat pump mode efficiency even though the waste heat of an electric component module is insufficient.

A further object of the present invention is to provide a vehicular heat management system capable of improving the heating performance in a passenger room regardless of the waste heat of an electric component module.

A still further object of the present invention is to provide a vehicular heat management system capable of additionally recovering ambient air heat to a refrigerant of a refrigerant circulation line using an air-cooled outdoor heat exchanger and efficiently recovering the ambient air heat to the refrigerant in the refrigerant circulation line without the flow path resistance and pressure loss caused by refrigerant resistors and a long pipe when using the air-cooled outdoor heat exchanger.

Means to Solve the Task

In order to achieve these objects, there is provided a vehicular heat management system, including: a heat pump type refrigerant circulation line configured to operate in an air conditioner mode or a heat pump mode to cool and heat a passenger room; a cooling water circulation line configured to allow a cooling water to circulate toward an electric component module, the refrigerant circulation line including a water-cooled heat exchanger configured to allow a refrigerant to exchange heat with the cooling water in the cooling water circulation line to recover waste heat of the electric component module absorbed by the cooling water to the refrigerant in the refrigerant circulation line and an air-cooled outdoor heat exchanger installed on the downstream side of the water-cooled heat exchanger; and a refrigerant flow control part configured to control a refrigerant flow path in the refrigerant circulation line to the water-cooled heat exchanger and the air-cooled outdoor heat exchanger in the heat pump mode.

The system may further include: a waste heat recovery sufficiency determination part configured to determine whether the waste heat of the electric component module is sufficiently recovered to the refrigerant in the water-cooled heat exchanger in the heat pump mode, wherein in the heat pump mode, the refrigerant flow control part may control the refrigerant flow path in the refrigerant circulation line to be connected to the water-cooled heat exchanger and a compressor or to the water-cooled heat exchanger, the air-cooled outdoor heat exchanger and the compressor depending on the result of determination of the waste heat recovery sufficiency determination part.

When the waste heat recovery sufficiency determination part determines that the waste heat of the electric component module is sufficiently recovered to the refrigerant, the refrigerant flow control part may control the refrigerant flow path so that the refrigerant in the refrigerant circulation line passes through the water-cooled heat exchanger, recovers the waste heat of the electric component module, and then returns to the compressor.

When the waste heat recovery sufficiency determination part determines that the waste heat of the electric component module is not sufficiently recovered to the refrigerant, the refrigerant flow control part may control the refrigerant flow path so that the refrigerant in the refrigerant circulation line sequentially passes through the water-cooled heat exchanger and the air-cooled outdoor heat exchanger to primarily recover the waste heat of the electric component module and secondarily recover the ambient air heat around the air-cooled outdoor heat exchanger, and then returns to the compressor.

The refrigerant flow control part may include a three-way flow control valve installed in the refrigerant circulation line between the water-cooled heat exchanger and the air-cooled outdoor heat exchanger and configured to connect the water-cooled heat exchanger and the compressor or connect the water-cooled heat exchanger and the air-cooled outdoor heat exchanger, a connection line configured to connect a portion of the refrigerant circulation line on the downstream side of the water-cooled heat exchanger and a portion of the refrigerant circulation line on the upstream side of the compressor, an opening/closing valve configured to open and close the connection line, and a microcomputer configured to control the three-way flow control valve and the opening/closing valve according to the sufficiency of recovery of the waste heat to the refrigerant, and the microcomputer may be configured to, when the waste heat of the electric component module is sufficiently recovered to the refrigerant, control the three-way flow control valve to connect the water-cooled heat exchanger and the compressor and control the opening/closing valve to block the connection line so that the refrigerant in the refrigerant circulation line recovers the waste heat of the electric component module in the water-cooled heat exchanger and then returns to the compressor, and may be configured to, when the waste heat of the electric component module is not sufficiently recovered to the refrigerant, control the three-way flow control valve to connect the water-cooled heat exchanger and the air-cooled outdoor heat exchanger and control the opening/closing valve to open the connection line so that the refrigerant in the refrigerant circulation line sequentially circulates the water-cooled heat exchanger and the air-cooled outdoor heat exchanger to recover the waste heat of the electric component module and the ambient air heat and then returns to the compressor.

The system may further include: an icing generation detection part configured to detect generation of icing on a surface of the air-cooled outdoor heat exchanger, wherein the refrigerant flow control part may configured to, when the icing generation detection part detects generation of icing on the surface of the air-cooled outdoor heat exchanger in the heat pump mode, control a flow of the refrigerant in the refrigerant circulation line so as to prevent the refrigerant from flowing from the water-cooled heat exchanger to the air-cooled outdoor heat exchanger.

The refrigerant flow control part may be configured to, when the icing generation detection part detects generation of icing on the surface of the air-cooled outdoor heat exchanger in the heat pump mode, control the three-way flow control valve to connect the water-cooled heat exchanger and the compressor and control the opening/closing valve to block the connection line so that the refrigerant is prevented from flowing from the water-cooled heat exchanger to the air-cooled outdoor heat exchanger and is allowed to flow from the water-cooled heat exchanger to the compressor.

The waste heat recovery sufficiency determination part may be configured to, when a vehicle is currently in an idling state in the heat pump mode, determine that a temperature of the waste heat of the electric component module is lower than a preset temperature and the waste heat of the electric component module is not sufficiently recovered to the refrigerant in the water-cooled heat exchanger in an amount smaller than a preset amount, and may be configured to, when the vehicle is currently in a driving state rather than the idling state in the heat pump mode, determine that the temperature of the waste heat of the electric component module is equal to or higher than the preset temperature and the waste heat of the electric component module is sufficiently recovered to the refrigerant in the water-cooled heat exchanger in an amount equal to or larger than the preset amount.

Effect of the Invention

According to the vehicular heat management system of the present invention, under conditions where the waste heat temperature of the electric component module is low and the recovery of the waste heat of the electric component module to the refrigerant is insufficient in the heat pump mode, the air-cooled outdoor heat exchanger is used to additionally recover the ambient air heat to the refrigerant in the refrigerant circulation line.

As a result, despite the insufficient recovery of the waste heat of the electric component module, the heat pump mode efficiency can be improved by increasing the waste heat recovery efficiency of the refrigerant in the refrigerant circulation line.

In addition, since the heat pump mode efficiency can be improved by increasing the waste heat recovery efficiency of the refrigerant in the refrigerant circulation line despite the insufficient recovery of the waste heat of the electric component module, it is possible to improve the heating performance in the passenger room regardless of the amount of the waste heat of the electric component module.

In addition, when using the air-cooled outdoor heat exchanger to additionally recover the ambient air heat to the refrigerant in the refrigerant circulation line, the refrigerant discharged from the air-cooled outdoor heat exchanger after recovering the ambient air heat is directly returned to the compressor.

As a result, unlike the related art, the refrigerant discharged from the air-cooled outdoor heat exchanger after recovering the ambient air heat does not have to pass through the resistors such as the air conditioner mode expansion valve and the low-pressure side heat exchanger, and the long refrigerant pipe.

Therefore, the ambient air heat can be efficiently recovered to the refrigerant in the refrigerant circulation line without the flow resistance and pressure loss of the refrigerant which may otherwise occur due to passage of the resistors and the long refrigerant pipe. As a result, it is possible to improve the performance of the heat pump mode.

BEST MODE TO IMPLEMENT THE INVENTION

Figure 1:
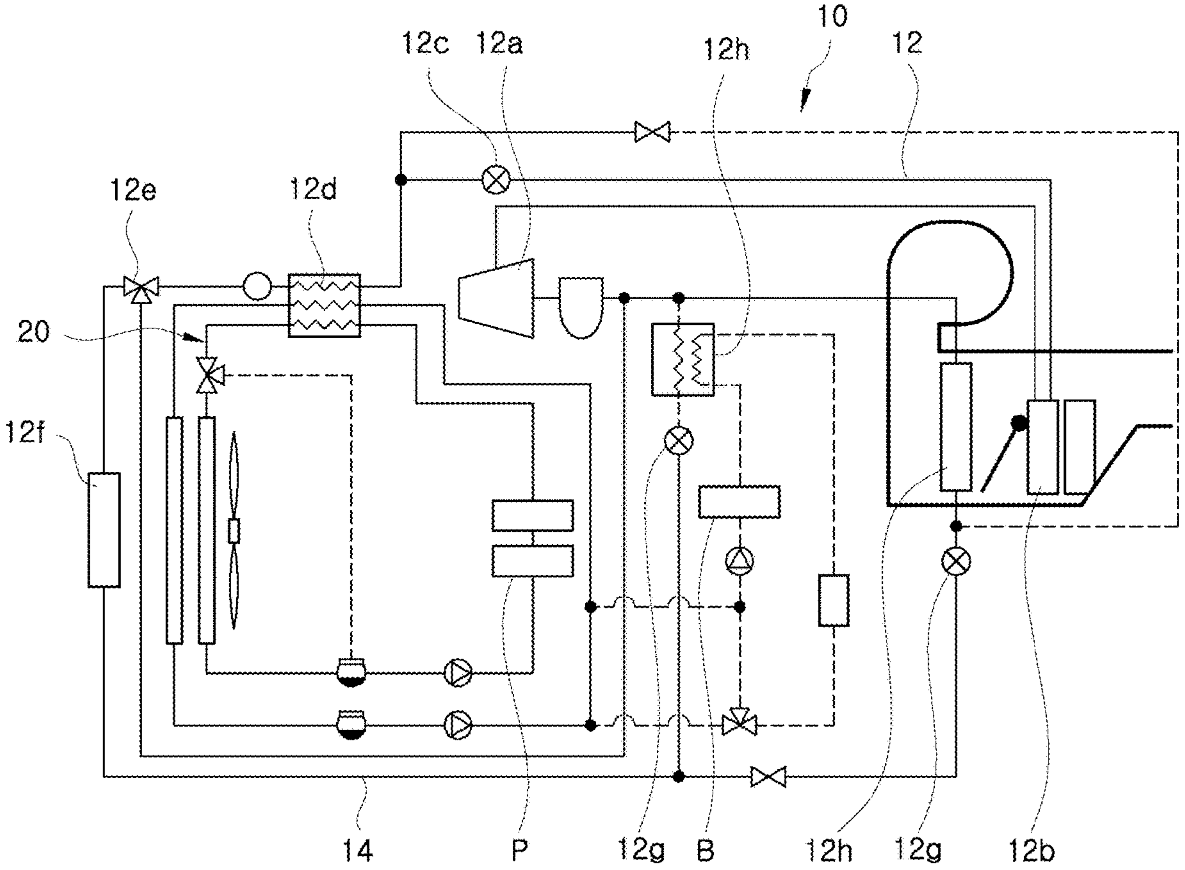
FIG. 1 is a view showing a conventional vehicular heat management system.

A preferred embodiment of a vehicular heat management system according to the present invention will now be described in detail with reference to the accompanying drawings (The same components as those of the conventional vehicular heat management system described above will be designated by like reference numerals).

Prior to describing the features of the vehicular heat management system according to the present invention, the general configurations of the vehicular heat management system will be briefly described with reference to FIG. 2.

The vehicular heat management system includes an air conditioning system 10 for cooling and heating a passenger room. The air conditioning system is of a heat pump type and is provided with a refrigerant circulation line 12.

The refrigerant circulation line 12 includes a compressor **12*a*, a high pressure side heat exchanger 12*b*, a heat pump mode expansion valve 12*c*, a water-cooled heat exchanger 12*d*, a three-way flow control valve 12*e*, an air-cooled outdoor heat exchanger 12*f*, a plurality of air conditioner mode expansion valves 12*g* installed in parallel with each other, and a plurality of low pressure side heat exchangers 12*h* installed downstream of the respective air conditioner mode expansion valves 12*g***.

This refrigerant circulation line 12 opens the heat pump mode expansion valve **12*c*** in an air conditioner mode.

Therefore, the refrigerant in the compressor **12*a* is not depressurized and expanded by the heat pump mode expansion valve 12*c* and can be circulated in the order of the high pressure side heat exchanger 12***b*, the water-cooled heat exchanger 12*d*, the three-way flow control valve 12*e*, the air-cooled outdoor heat exchanger 12*f*, the air conditioner mode expansion valve 12*g*, the low pressure side heat exchanger 12*h*, and the compressor 12*a*.

In addition, in the heat pump mode, the heat pump mode expansion valve 12*c* is turned on to allow depressurization and expansion of the refrigerant.

Therefore, the refrigerant in the compressor 12*a* can be circulated in the order of the high pressure side heat exchanger 12*b*, the heat pump mode expansion valve 12*c*, the water-cooled heat exchanger 12*d*, the three-way flow control valve 12*e*, and the compressor 12*a*.

Meanwhile, the water-cooled heat exchanger 12*d* functions as an evaporator in the heat pump mode and also plays a role in allowing the refrigerant flowing therein to exchange heat with the cooling water on the cooling water circulation line 20 side that has absorbed the waste heat of an electric component module P.

Accordingly, the waste heat of the electric component module P can be recovered to the refrigerant in the refrigerant circulation line 12, and as a result, the heat pump mode efficiency of the air conditioning system 10 can be increased.

Next, the features of the vehicular heat management system according to the present invention will be described in detail with reference to FIGS. 2 to 4.

Figure 2:
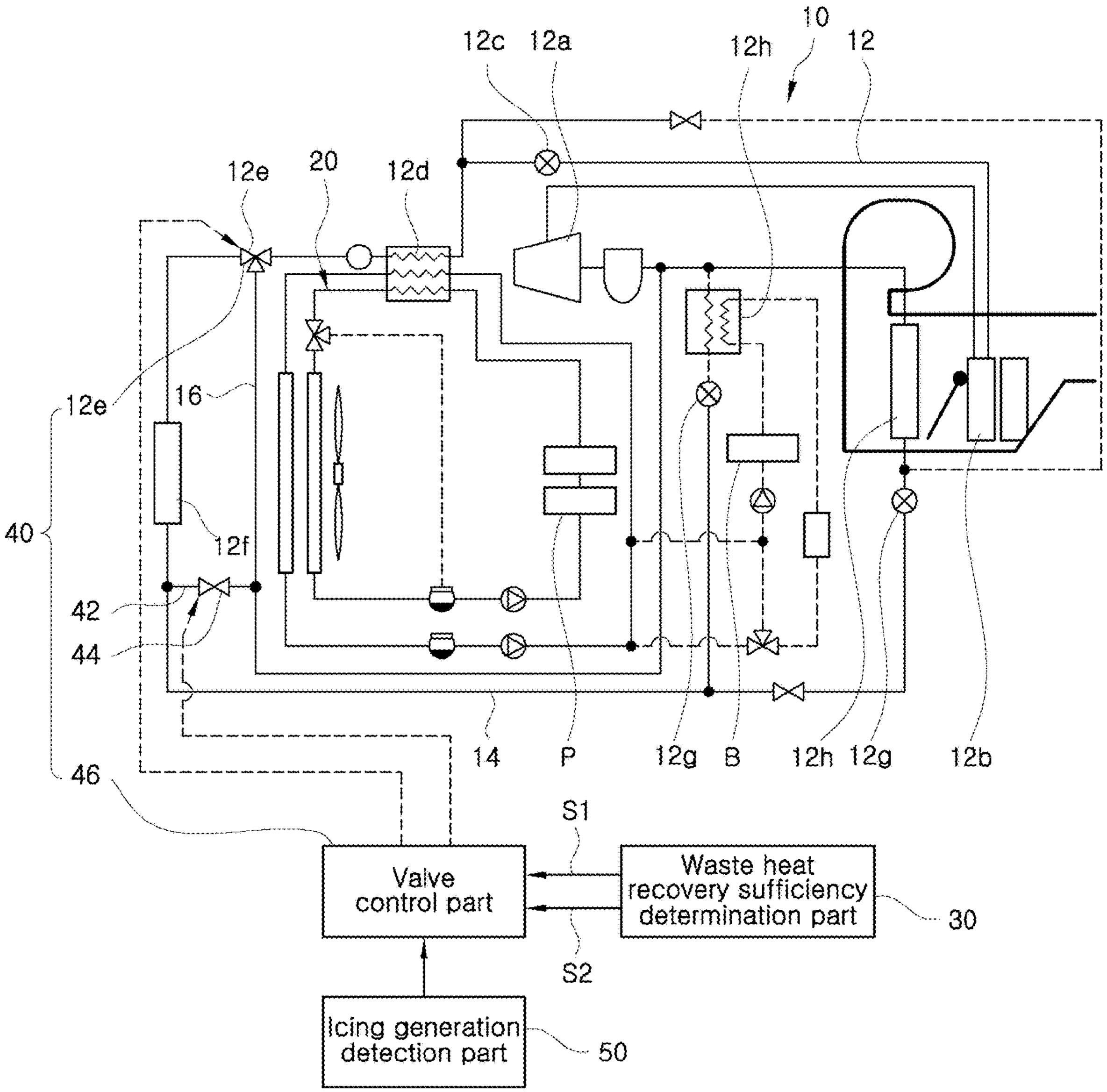
FIG. 2 is a view showing a vehicular heat management system according to the present invention.

Referring first to FIG. 2, the heat management system of the present invention includes a waste heat recovery sufficiency determination part 30 configured to determine whether the waste heat of the electric component module P is sufficiently recovered to the refrigerant in the water-cooled heat exchanger 12*d* in the heat pump mode.

The waste heat recovery sufficiency determination part 30 is equipped with a microprocessor and is configured to determine whether the waste heat of the electric component module P is sufficiently recovered to the refrigerant in a predetermined amount or more in the heat pump mode depending on whether a vehicle is currently in an idling state.

In particular, if the vehicle is currently in a driving state rather than an idling state, the waste heat recovery sufficiency determination part 30 determines that the current waste heat temperature of the electric component module P is equal to or higher than a set temperature and that the waste heat of the electric component module P is sufficiently recovered to the refrigerant in a predetermined amount or more. The waste heat recovery sufficiency determination part 30 outputs a waste heat recovery sufficiency signal S1 based on such determination.

On the other hand, if the vehicle is currently in an idling state, the waste heat recovery sufficiency determination part 30 determines that the current waste heat temperature of the electric component module P is lower than the set temperature and that the waste heat of the electric component module P is insufficiently recovered to the refrigerant in an amount smaller than the predetermined amount. The waste heat recovery sufficiency determination part 30 outputs a waste heat recovery insufficiency signal S2 based on such determination.

The heat management system of the present invention further includes a refrigerant flow control part 40 configured to control a refrigerant flow path in the refrigerant circulation line 12 with respect to the water-cooled heat exchanger 12*d* and the air-cooled outdoor heat exchanger 12*f* depending on the degree of recovery of the waste heat of the electric component module P to the refrigerant in the water-cooled heat exchanger 12*d* in the heat pump mode.

In the heat pump mode, the refrigerant flow control part 40 controls a refrigerant flow path with respect to the water-cooled heat exchanger 12*d* and the air-cooled outdoor heat exchanger 12*f* depending on the result of determination of the waste heat recovery sufficiency determination part 30 on the sufficiency of recovery of the waste heat of the electric component module P.

To explain this in more detail, the refrigerant flow control part 40 includes a three-way flow control valve 12*e* installed on a portion of the refrigerant circulation line 12 between the water-cooled heat exchanger 12*d* and the air-cooled outdoor heat exchanger 12*f*, a connection line 42 configured to connect a portion of the refrigerant circulation line 12 on the downstream side of the water-cooled heat exchanger 12*d* and a portion of the refrigerant circulation line 12 on the upstream side of the compressor 12*a*, an opening/closing valve 44 installed on the connection line 42, and a microcomputer 46 configured to control the three-way flow control valve 12*e* and the opening/closing valve 44.

Figure 3:
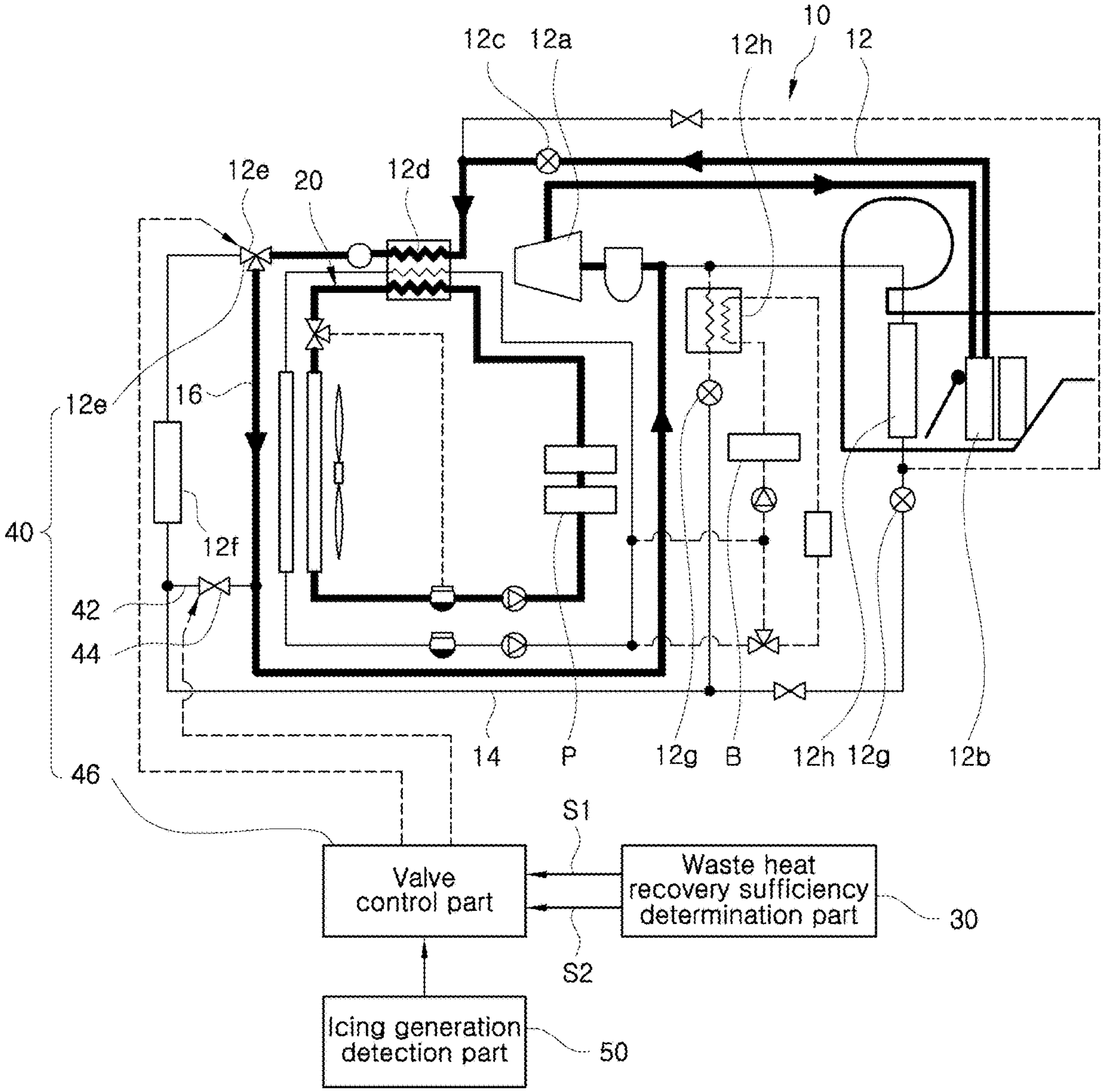
FIG. 3 is a diagram showing an operation example of the vehicular heat management system according to the present invention when the waste heat of an electric component module is sufficient in a heat pump mode.

When the recovery of waste heat of the electric component module P to the refrigerant is sufficient in the heat pump mode, as shown in FIG. 3, the three-way flow control valve 12*e* directly connect the water-cooled heat exchanger 12*d* and the compressor 12*a*.

In particular, the three-way flow control valve 12*e* connects the water-cooled heat exchanger 12*d* and a heat pump mode heating line 16 configured to allow the refrigerant on the discharge side of the water-cooled heat exchanger 12*d* to bypass to the compressor 12*a* before being introduced into the air-cooled outdoor heat exchanger 12*f*.

In this way, the refrigerant discharged from the water-cooled heat exchanger 12*d* is introduced into the compressor 12*a* before being introduced into the air-cooled outdoor heat exchanger 12*f*.

Accordingly, the refrigerant that has recovered the waste heat of the electric component module P in the water-cooled heat exchanger 12*d* can be directly introduced into the compressor 12*a*.

Figure 4:
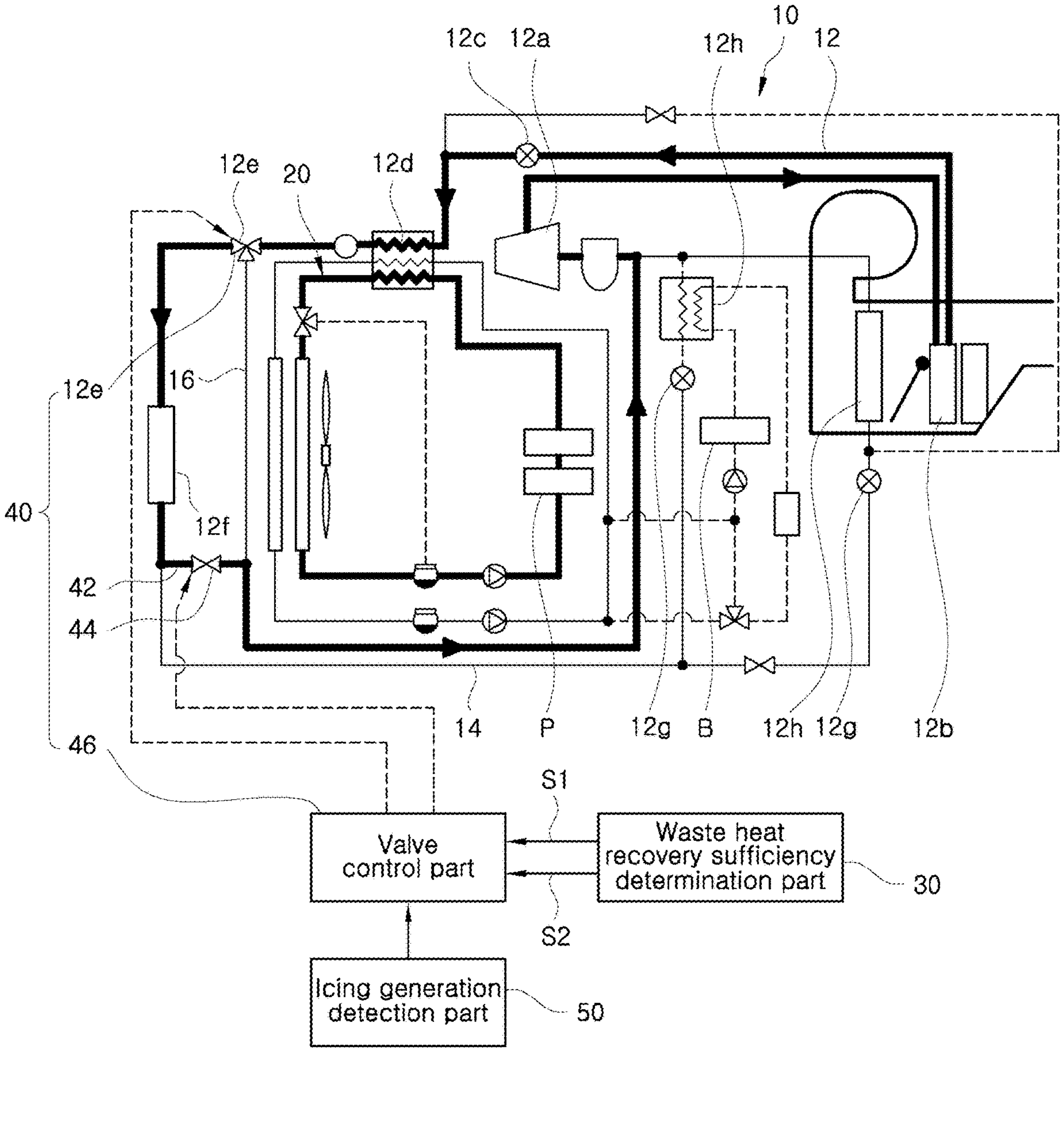
FIG. 4 is a diagram showing an operation example of the vehicular heat management system according to the present invention when the waste heat of the electric component module is insufficient in the heat pump mode.

On the other hand, when the recovery of the waste heat of the electric component module P to the refrigerant is insufficient, as shown in FIG. 4, the water-cooled heat exchanger 12*d* and the air-cooled outdoor heat exchanger 12*f* are connected in series so that the refrigerant passed through the water-cooled heat exchanger 12*d* flows toward the air-cooled outdoor heat exchanger 12*f*.

Accordingly, the refrigerant that has primarily recovered the waste heat of the electric component module P in the water-cooled heat exchanger 12*d* can circulate to the air-cooled outdoor heat exchanger 12 to secondarily recover the ambient air heat.

The connection line 42 connects a portion of the refrigerant circulation line 12 on the downstream side of the water-cooled heat exchanger 12*d* and a portion of the heat pump mode heating line 16 on the upstream side of the compressor 12*a*.

The connection line 42 serves to introduce the refrigerant that has sequentially passed through the water-cooled heat exchanger 12*d* and the air-cooled outdoor heat exchanger 12*f* into the heat pump mode heating line 16, finally introducing the refrigerant into the inlet of the compressor 12*a*.

In particular, when the recovery of the waste heat of the electric component module P to the refrigerant in the water-cooled heat exchanger 12*d* is insufficient and the refrigerant discharged from the water-cooled heat exchanger 12*d* is circulated toward the air-cooled outdoor heat exchanger 12*f*, as shown in FIG. 4, the refrigerant that has passed through the air-cooled outdoor heat exchanger 12*f* is introduced into the inlet of the compressor 12*a*.

As shown in FIG. 4, the opening/closing valve 44 opens the connection line 42 when the recovery of the waste heat of the electric component module P to the refrigerant in the water-cooled heat exchanger 12*d* is insufficient.

Therefore, when the recovery of the waste heat of the electric component module P to the refrigerant is insufficient and the refrigerant discharged from the water-cooled heat exchanger 12*d* is circulated toward the air-cooled outdoor heat exchanger 12*f*, the refrigerant passed through the air-cooled outdoor heat exchanger 12*f* is allowed to circulate to the inlet of the compressor 12*a* through the heat pump mode heating line 16.

The opening/closing valve 44 is configured to always block the connection line 42, except when the recovery of the waste heat of the electric component module P to the refrigerant is insufficient. For example, when the recovery of the waste heat of the electric component module P is sufficient, or in the air conditioner mode, the opening/closing valve 44 blocks the connection line 42 at all times.

When the waste heat recovery sufficiency determination part 30 determines that the recovery of the waste heat of the electric component module P to the refrigerant is sufficient in the heat pump mode and outputs a waste heat recovery sufficiency signal S1, the microcomputer 46 controls the three-way flow control valve 12*e* and the opening/closing valve 44 in response to the outputted signal.

As shown in FIG. 3, the three-way flow control valve 12*e* is controlled so as to connect the water-cooled heat exchanger 12*d* and the inlet of the compressor 12*a*, and the opening/closing valve 44 is controlled so as to block the connection line 42.

Therefore, under conditions where the recovery of the waste heat of the electric component module P to the refrigerant is sufficient, the refrigerant that has recovered the waste heat of the electric component module P in the water-cooled heat exchanger 12*d* can be directly introduced into the compressor 12*a*.

Accordingly, under conditions where the recovery of the waste heat of the electric component module P to the refrigerant is sufficient, the refrigerant that has recovered only the waste heat of the electric component module P absorbed to the cooling water circulation line 20 (hereinafter referred to as "water heat") can be returned to the compressor 12*a*.

On the other hand, when the waste heat recovery sufficiency determination part 30 determines that the recovery of the waste heat of the electric component module P to the refrigerant is insufficient in the heat pump mode and outputs a waste heat recovery insufficiency signal S2, as shown in FIG. 4, the microcomputer 46 controls the three-way flow control valve 12*e* so as to connect the water-cooled heat exchanger 12*d* and the air-cooled outdoor heat exchanger 12*f* in series, and controls the opening/closing valve 44 so as to open the connection line 42.

Therefore, under conditions where the recovery of the waste heat of the electric component module P to the refrigerant is insufficient, the refrigerant that has primarily recovered the waste heat of the electric component module P, i.e., the water heat in the water-cooled heat exchanger 12*d* is circulated through the air-cooled outdoor heat exchanger 12*f* to secondarily recover the ambient air heat. The refrigerant that has primarily and secondarily recovered the water heat and the ambient air heat can be directly returned to the compressor 12*a*.

Thus, under conditions where the recovery of the waste heat of the electric component module P to the refrigerant is insufficient, the water heat and the ambient air heat can be recovered simultaneously to the refrigerant in the refrigerant circulation line 12, thereby compensating for the insufficient recovery of the waste heat of the electric component module P.

As a result, despite the insufficient recovery of the waste heat of the electric component module P to the refrigerant, the waste heat recovery efficiency of the refrigerant can be increased, and as a result, the heating performance in the passenger room can be improved by increasing the heat pump mode efficiency.

In addition, according to the present invention, when the ambient air heat is additionally recovered by circulating the refrigerant toward the air-cooled outdoor heat exchanger 12*f*, the refrigerant discharged from the air-cooled outdoor heat exchanger 12*f* after recovering the ambient air heat can be directly returned to the compressor 12*a*.

As a result, unlike the related art, the refrigerant discharged from the air-cooled outdoor heat exchanger 12*f* after recovering the ambient air heat does not have to pass through the resistors such as the air conditioner mode expansion valve 12*g* and the low-pressure side heat exchanger 12*h*, and the long refrigerant pipe on the side of the air conditioner mode cooling line 14.

Therefore, the ambient air heat can be efficiently recovered to the refrigerant in the refrigerant circulation line 12 without the flow resistance and pressure loss of the refrigerant which may otherwise occur due to passage of the resistors and the long refrigerant pipe. As a result, it is possible to improve the performance of the heat pump mode.

In addition, in the heat pump mode, the refrigerant discharged from the air-cooled outdoor heat exchanger 12*f* after recovering the ambient air heat is returned directly to the compressor 12*a* through the heat pump mode heating line 16 without passing through the resistors in the air conditioner mode cooling line 14 and the long refrigerant pipe.

Accordingly, the air conditioner mode cooling line used in the air conditioner mode and the heat pump mode heating line 16 used in the heat pump mode are completely separated from the refrigerant flow path for each mode.

Thus, unlike the related art, in the heat pump mode, the refrigerant discharged from the air-cooled outdoor heat exchanger 12*f* after recovering the ambient air heat does not need to be returned to the compressor 12*a* using the air conditioner mode cooling line 14.

As a result, unlike the related art, even in the heat pump mode, it is possible to prevent the flow resistance and pressure loss of the refrigerant due to using the air conditioner mode cooling line 14, and it is not necessary to increase the diameter of the refrigerant pipe.

Accordingly, it is possible to reduce costs and to eliminate design constraints.

Referring again to FIG. 2, the vehicular heat management system according to the present invention further includes an icing generation detection part 50 configured to detect generation of icing on the surface of the air-cooled outdoor heat exchanger 12*f*.

The icing generation detection part 50 includes a temperature sensor (not shown) configured to detect surface temperature of the air-cooled outdoor heat exchanger 12*f*, and a microcomputer 46 configured to determine whether icing is generated on the surface of the air-cooled outdoor heat exchanger 12*f* according to the surface temperature of the air-cooled outdoor heat exchanger 12*f* detected by the temperature sensor.

The microcomputer 46 determines that icing is generated on the surface of the air-cooled outdoor heat exchanger 12*f* if the surface temperature of the air-cooled outdoor heat exchanger 12*f* detected by the temperature sensor is lower than preset reference temperature.

When it is determined that icing is generated on the surface of the air-cooled outdoor heat exchanger 12*f* in the heat pump mode, the microcomputer 46 of the refrigerant flow control part 40 controls the three-way flow control valve 12*e* and the opening/closing valve 44 to allow the refrigerant passing through the water-cooled heat exchanger 12*d* to flow toward the compressor 12*a*.

In particular, as shown in FIG. 4, if it is determined that icing is generated on the surface of the air-cooled outdoor heat exchanger 12*f* in a state in which the refrigerant in the refrigerant circulation line 12 sequentially passes through the water-cooled heat exchanger 12*d* and the air-cooled outdoor heat exchanger 12 to recover the water heat and the ambient air heat, the microcomputer 46 of the refrigerant flow control part 40 controls the three-way flow control valve 12*e* and the opening/closing valve 44 as shown in FIG. 3.

Accordingly, the flow of the refrigerant from the water-cooled heat exchanger 12*d* to the air-cooled outdoor heat exchanger 12*f* is prevented, and the flow of the refrigerant from the water-cooled heat exchanger 12*d* to the compressor 12*a* is allowed.

That is, the three-way flow control valve 12*e* is controlled to connect the water-cooled heat exchanger 12*d* and the inlet of the compressor 12*a*, and the opening/closing valve 44 is controlled to block the connection line 42.

Therefore, when icing is generated on the surface of the air-cooled outdoor heat exchanger 12*f* in the heat pump mode, the introduction of the refrigerant into the air-cooled outdoor heat exchanger 12*f* is prevented as shown in FIG. 3. As a result, the generation of icing in the air-cooled outdoor heat exchanger 12*f* is fundamentally prevented.

According to the vehicular heat management system of the present invention, under conditions where the waste heat temperature of the electric component module P is low and the recovery of the waste heat of the electric component module P to the refrigerant is insufficient in the heat pump mode, the air-cooled outdoor heat exchanger 12*f* is used to additionally recover the ambient air heat to the refrigerant in the refrigerant circulation line 12.

As a result, despite the insufficient recovery of the waste heat of the electric component module P, the heat pump mode efficiency can be improved by increasing the waste heat recovery efficiency of the refrigerant in the refrigerant circulation line 12.

In addition, since the heat pump mode efficiency can be improved by increasing the waste heat recovery efficiency of the refrigerant in the refrigerant circulation line 12 despite the insufficient recovery of the waste heat of the electric component module P, it is possible to improve the heating performance in the passenger room regardless of the amount of the waste heat of the electric component module P.

In addition, when using the air-cooled outdoor heat exchanger 12*f* to additionally recover the ambient air heat to the refrigerant in the refrigerant circulation line 12, the refrigerant discharged from the air-cooled outdoor heat exchanger 12*f* after recovering the ambient air heat is directly returned to the compressor 12*a*.

As a result, unlike the related art, the refrigerant discharged from the air-cooled outdoor heat exchanger 12*g* after recovering the ambient air heat does not have to pass through the resistors such as the air conditioner mode expansion valve 12*g* and the low-pressure side heat exchanger 12*h*, and the long refrigerant pipe.

Therefore, the ambient air heat can be efficiently recovered to the refrigerant in the refrigerant circulation line 12 without the flow resistance and pressure loss of the refrigerant which may otherwise occur due to passage of the resistors and the long refrigerant pipe. As a result, it is possible to improve the performance of the heat pump mode.

The preferred embodiment of the present invention has been described above by way of example. However, the scope of the present invention is not limited to the specific embodiment and may be appropriately modified within the scope recited in the claims.

For example, in the detailed description and the drawings of the present invention, the waste heat recovery sufficiency determination part 30 and the icing generation detection part 50 are described as being configured separately from the microcomputer 46. Alternatively, the waste heat recovery sufficiency determination part 30 and the icing generation detection part 50 may be integrated into the microcomputer 46.

The invention claimed is:

1. A vehicular heat management system, comprising:

a heat pump type refrigerant circulation line configured to operate in an air conditioner mode or a heat pump mode to cool and heat a passenger room;

a cooling water circulation line configured to allow a cooling water to circulate toward an electric component module, the refrigerant circulation line including a water-cooled heat exchanger configured to allow a refrigerant to exchange heat with the cooling water in the cooling water circulation line to recover waste heat of the electric component module absorbed by the cooling water to the refrigerant in the refrigerant circulation line and an air-cooled outdoor heat exchanger installed on the downstream side of the water-cooled heat exchanger;

a refrigerant flow control part configured to control a refrigerant flow path in the refrigerant circulation line to the water-cooled heat exchanger and the air-cooled outdoor heat exchanger in the heat pump mode;

a heat pump mode heating line configured to allow the refrigerant discharged from the water-cooled heat exchanger to bypass to the compressor before being introduced into the air-cooled outdoor heat exchanger, an air conditioner mode cooling line configured to allow the refrigerant discharged from the air-cooled outdoor heat exchanger to flow toward an air conditioner mode expansion valve and a low pressure side heat exchanger;

a connection line configured to connect a portion of the refrigerant circulation line on the downstream side of the air-cooled outdoor heat exchanger and the heat pump mode heating line; and an opening/closing valve configured to open and close the connection line, wherein the refrigerant flow control part includes a three-way flow control valve installed in the refrigerant circulation line between the water-cooled heat exchanger and the air-cooled outdoor heat exchanger and configured to connect the water-cooled heat exchanger and the compressor or connect the water-cooled heat exchanger and the air-cooled outdoor heat exchanger, wherein the refrigerant passed through the water-cooled heat exchanger flows toward the air-cooled outdoor heat exchanger when the recovery of the waste heat of the electric component module to the refrigerant is insufficient, and wherein the refrigerant that has passed through the air-cooled outdoor heat exchanger is introduced into the inlet of the compressor through heat pump mode heating line.

2. The system of claim 1, further comprising:

a waste heat recovery sufficiency determination part configured to determine whether the waste heat of the electric component module is sufficiently recovered to the refrigerant in the water-cooled heat exchanger in the heat pump mode, wherein in the heat pump mode, the refrigerant flow control part controls the refrigerant flow path in the refrigerant circulation line to be connected to the water-cooled heat exchanger and a compressor or to the water-cooled heat exchanger, the air-cooled outdoor heat exchanger and the compressor depending on the result of determination of the waste heat recovery sufficiency determination part.

3. The system of claim 2, wherein when the waste heat recovery sufficiency determination part determines that the waste heat of the electric component module is sufficiently recovered to the refrigerant, the refrigerant flow control part controls the refrigerant flow path so that the refrigerant in the refrigerant circulation line passes through the water-cooled heat exchanger, recovers the waste heat of the electric component module, and then returns to the compressor.

4. The system of claim 3, wherein when the waste heat recovery sufficiency determination part determines that the waste heat of the electric component module is not sufficiently recovered to the refrigerant, the refrigerant flow control part controls the refrigerant flow path so that the refrigerant in the refrigerant circulation line sequentially passes through the water-cooled heat exchanger and the air-cooled outdoor heat exchanger to primarily recover the waste heat of the electric component module and secondarily recover the ambient air heat around the air-cooled outdoor heat exchanger, and then returns to the compressor.

5. The system of claim 4, wherein the refrigerant flow control part includes a microcomputer configured to control the three-way flow control valve and the opening/closing valve according to the sufficiency of recovery of the waste heat to the refrigerant, and the microcomputer is configured to, when the waste heat of the electric component module is sufficiently recovered to the refrigerant, control the three-way flow control valve to connect the water-cooled heat exchanger and the compressor and control the opening/closing valve to block the connection line so that the refrigerant in the refrigerant circulation line recovers the waste heat of the electric component module in the water-cooled heat exchanger and then returns to the compressor, and is configured to, when the waste heat of the electric component module is not sufficiently recovered to the refrigerant, control the three-way flow control valve to connect the water-cooled heat exchanger and the air-cooled outdoor heat exchanger and control the opening/closing valve to open the connection line so that the refrigerant in the refrigerant circulation line sequentially circulates the water-cooled heat exchanger and the air-cooled outdoor heat exchanger to recover the waste heat of the electric component module and the ambient air heat and then returns to the compressor.

6. The system of claim 5, further comprising:

an icing generation detection part configured to detect generation of icing on a surface of the air-cooled outdoor heat exchanger, wherein the refrigerant flow control part is configured to, when the icing generation detection part detects generation of icing on the surface of the air-cooled outdoor heat exchanger in the heat pump mode, control a flow of the refrigerant in the refrigerant circulation line so as to prevent the refrigerant from flowing from the water-cooled heat exchanger to the air-cooled outdoor heat exchanger.

7. The system of claim 6, wherein the refrigerant flow control part is configured to, when the icing generation detection part detects generation of icing on the surface of the air-cooled outdoor heat exchanger in the heat pump mode, control the three-way flow control valve to connect the water-cooled heat exchanger and the compressor and control the opening/closing valve to block the connection line so that the refrigerant is prevented from flowing from the water-cooled heat exchanger to the air-cooled outdoor heat exchanger and is allowed to flow from the water-cooled heat exchanger to the compressor.

8. The system of claim 2, wherein the waste heat recovery sufficiency determination part is configured to, when a vehicle is currently in an idling state in the heat pump mode, determine that a temperature of the waste heat of the electric component module is lower than preset temperature and the waste heat of the electric component module is not sufficiently recovered to the refrigerant in the water-cooled heat exchanger in an amount smaller than preset amount, and is configured to, when the vehicle is currently in a driving state rather than the idling state in the heat pump mode, determine that the temperature of the waste heat of the electric component module is equal to or higher than the preset temperature and the waste heat of the electric component module is sufficiently recovered to the refrigerant in the water-cooled heat exchanger in an amount equal to or larger than the preset amount.

9. The system of claim 1, wherein the opening/closing valve is closed in the air conditioner mode, and the opening/closing valve is opened or closed in the heat pump mode.

10. The system of claim 1, wherein the air conditioner mode cooling line used in the air conditioner mode and the heat pump mode heating line used in the heat pump mode are completely separated from a refrigerant flow path for each mode.

* * * * *